No. 875,333. PATENTED DEC. 31, 1907.
F. L. DYER & D. HOLDEN.
MOVING PICTURE FILM.
APPLICATION FILED OCT. 21, 1905.
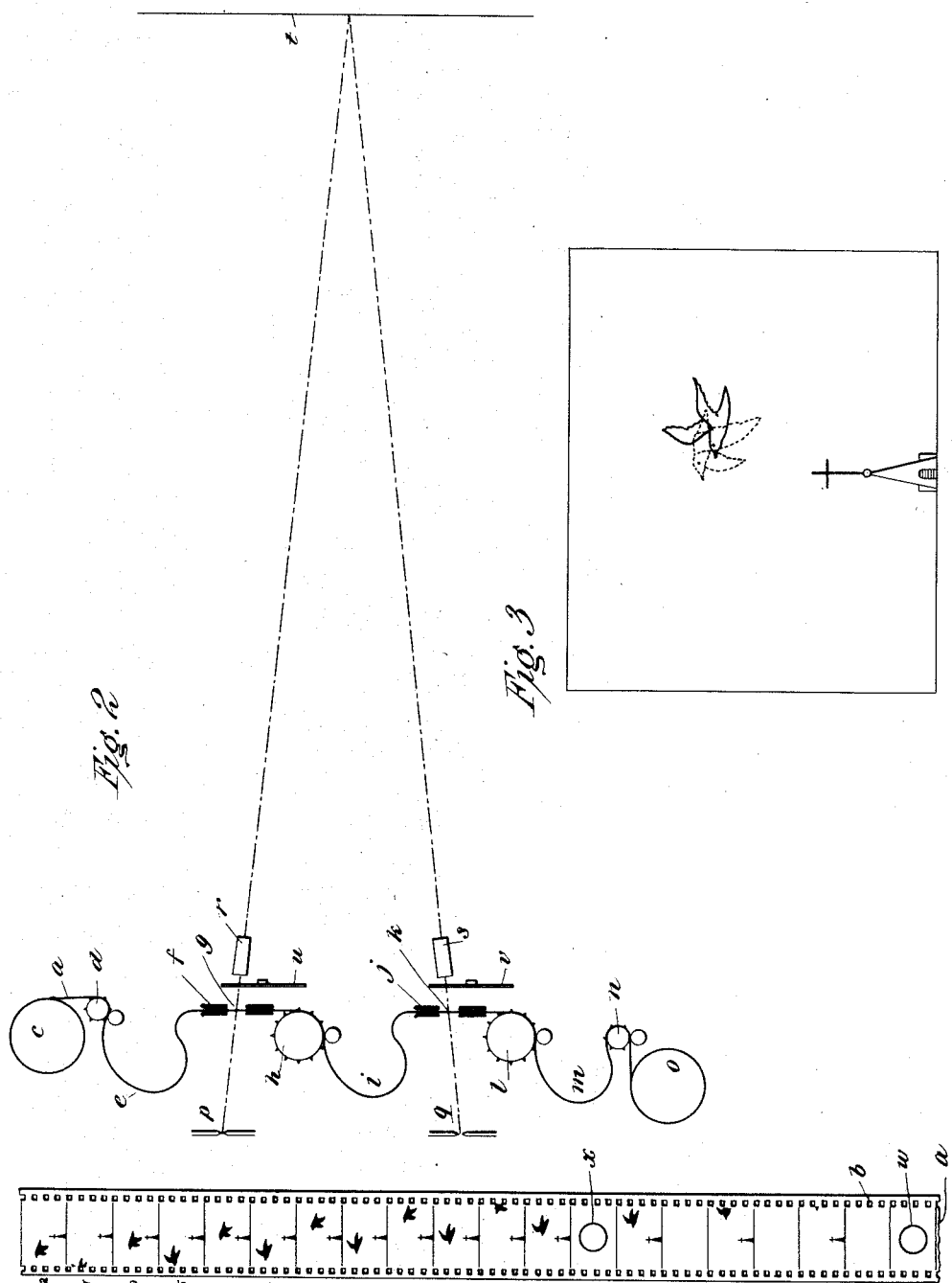
Witnesses: Inventors

UNITED STATES PATENT OFFICE.

FRANK L. DYER, OF MONTCLAIR, AND DELOS HOLDEN, OF UPPER MONTCLAIR, NEW JERSEY, ASSIGNORS TO EDISON MANUFACTURING COMPANY, OF WEST ORANGE, NEW JERSEY, A CORPORATION OF NEW JERSEY.

MOVING-PICTURE FILM.

No. 875,333.          Specification of Letters Patent.          Patented Dec. 31, 1907.

Application filed October 21, 1905. Serial No. 283,838.

*To all whom it may concern:*

Be it known that we, FRANK L. DYER, a citizen of the United States, and a resident of Montclair, in the county of Essex and State of New Jersey, and DELOS HOLDEN, a citizen of the United States, and a resident of Upper Montclair, in the county of Essex and State of New Jersey, have invented certain new and useful Improvements in Moving-Picture Films, of which the following is a description.

Our invention relates to moving picture films of the type wherein the pictures representing successive phases of movement are not arranged in a single, regular numerical sequence, but are arranged in two arithmetical series, the members of which alternate, one series being shifted longitudinally of the film as regards the other series, so that the photographs of one series are preceded by photographs of the other series which are representative of later phases of movement, whereby it becomes possible to exhibit the pictures of the two series in proper numerical order at separate display openings which are situated at some distance from each other, by intermittently moving the film at each opening in alternation a distance equal to the length of two adjacent pictures, as for example, the film disclosed in Patent No. 620,357, granted February 28th, 1899 to Prestwich. In using a film of this description it is necessary that the film be threaded through the apparatus in such a way that the pictures will be displayed in proper order, and in case an apparatus having two objectives for projecting the pictures is used the latter must be caused to focus at exactly the same spot upon the screen. These operations are both somewhat difficult as ordinarily it takes considerable study to determine from a moving picture film the order in which the pictures were taken.

It is the object of the present invention to produce a film of this description having indicia whereby these operations are greatly facilitated and whereby the danger of errors in inserting or threading the film through the apparatus will be avoided.

In order that the invention may be better understood, attention is directed to the accompanying drawings, forming part of this specification, and in which Figure 1, is an elevation of a fragment of our improved moving picture film, illustrating a flying bird as the moving object, and part of a steeple as the stationary background. Fig. 2, a diagrammatic view of a suitable apparatus for exhibiting the film, and Fig. 3, a view showing the exhibited picture on the screen, with the succeeding picture illustrated in dotted lines.

In these views corresponding parts are represented by the same letters of reference.

The film $a$ may be like the usual celluloid positive films now used in the art, having perforated edges $b$. The photographs shown on the film are arranged so that the pictures representative, for example, of odd numbers, (1, 3, 5, *et seq.*) commence near the beginning of the film, while those representative of even numbers (2, 4, 6, *et seq.*) are shifted lengthwise of the film so as to alternate with the odd numbered pictures representative of later phases of movement. Thus, in Fig. 1, we show the second picture as being arranged between the seventh and ninth pictures, but it might obviously be arranged between any other of the odd series, it being only important that enough length of film should exist between the first and second pictures as to allow for the distance between the two exposure openings in the exhibiting apparatus, and for the necessary slack.

In Fig. 2, we illustrate diagrammatically a suitable projecting apparatus for exhibiting the film, employing two sources of light, two objectives and two shutters. The film $a$ is accumulated on a reel $c$ and first passes over a continuously operating sprocket $d$, to form a loop $e$, as is common in the art. Thence the film passes through suitable guides $f$, past the first exposure opening $g$, at which point the pictures of one series are exhibited. The film now engages the sprocket $h$, having an intermittent feed movement of sufficient extent to advance the film a distance equal to two pictures at each feed movement, so that only the pictures of the desired series will be brought to rest opposite the exposure opening $g$, as will be understood. Below the intermittent feed $h$, the film forms a loop $i$, and then passes between guides *j*, forming a second exposure opening *k*, where the pictures of the second series are exhibited. Below this exposure opening the film engages a second intermittent sprocket *l*, similar to the sprocket *h*, and so timed with relation to the sprocket *h* as to exhibit at the exposure opening *k* only the pictures of the second series in alternation with the exhibition of the pictures of the first series at the exposure opening *g*. Below the second intermittent feed *l*, the film forms a loop *m* and engages a continuously operating sprocket *n*, as is common in the art, being finally wound on a take-up reel *o*, driven frictionally or in any other suitable and ordinary way.

We illustrate two sources of light *p* and *q*, but it will be understood that a single source of light may be used with mirrors or prisms for dividing the rays and directing them through the exposure openings. We also show two objectives *r* and *s* of the usual form, so inclined as to focus on the screen *t* at the same point, but it will be understood that a single objective may be used with mirrors or prisms for alternately directing the light rays from the two exposure openings through such objective, in which case a shutter need not be used.

When two objectives are employed, we prefer to use two shutters *u* and *v*, having opaque portions of 180 degrees, moving in the same direction and so timed that when the shutter *u* begins to cut off light from the exposure opening *g*, the shutter *v* will begin to open the exposure opening *k* and *vice versa*. With such an apparatus, the film will be exhibited as follows: The film is first "threaded" through the apparatus, care being taken that the first picture of one series shall be exhibited at the exposure opening *k*, and the first picture of the second series shall be exhibited at the exposure opening *g*. To facilitate this adjustment the film may be conveniently provided with two sections *w* and *x*, having convenient indicia thereon (a circle being shown), one of which is in advance of and in step with the pictures of each arithmetical series, and these sections are brought opposite the two exposure openings and can be employed for focusing and for determining the correct position of the pictures, preliminary to the operation of the film.

In operation, the film will be fed at two points, a picture of one series being exhibited at the exposure opening *g*, and during this exhibition, the succeeding picture of the second series will be brought opposite the exposure opening *k*, the feed mechanism being preferably so timed as to bring a succeeding picture to rest before the previously exhibited picture is moved, so that intervals exist between the feed movements, where one picture of both series will be held stationary in its exposure opening. As soon as the shutter *u* begins to cut off the picture shown at *g*, the shutter *v* will begin to disclose the picture at rest at the exposure opening *k*, so that when the shutters are moving across their exposure openings, the picture on the screen will be a composite picture, composed partly of the picture at the exposure opening *g*, and partly of the picture at the exposure opening *k*. As soon as the shutter fully masks the picture at the exposure opening *g*, the sprocket *h* will operate to advance the film so as to permit the exhibition of the succeeding picture of the same series at that exposure opening; and this is also of course true in connection with the exhibition of the succeeding pictures of the other series at the exposure opening *k*. It will be understood, however, that the shutters may be so arranged as to fully superimpose one of the pictures before the exhibited picture is withdrawn, but such an arrangement would not be so desirable for the reason that there would be a change of light, and possibly a slight flickering.

In Fig. 3, we illustrate the effect on the screen of the successive projection of two pictures, one being shown in full lines and the following in dotted lines. Of course, the difference in the phase of movement in the two pictures is somewhat exaggerated and should preferably be so gradual as to make the changes from one picture to another imperceptible to the eye.

Having now described our invention, what we claim as new and desire to secure by Letters Patent is as follows:

1. As a new article of manufacture, a moving picture film carrying two arithmetical series of photographs representing successive phases of movement the members of which series alternate, and the photographs of one series being preceded by photographs of the other series which are representative of later phases of movement, and an indicator for each series arranged in advance and in step with the pictures thereof, substantially as and for the purposes set forth.

2. As a new article of manufacture, a moving picture film carrying photographs representing successive phases of movement, the photographs constituting the even numbered series being relatively shifted longitudinally of the film with respect to the photographs representing the odd numbered series, and an indicator for each series arranged in advance and in step with the pictures thereof, substantially as and for the purposes set forth.

3. As a new article of manufacture, a moving picture film having pictures arranged in two distinct series and provided with two indicators corresponding to the two series, substantially as and for the purposes set forth.

4. As a new article of manufacture, a moving picture film, having its pictures arranged in two distinct series, and an indicator for each series arranged in advance thereof, substantially as and for the purposes set forth.

5. As a new article of manufacture, a moving picture film, having its pictures arranged in two distinct series, an indicator for each series in advance thereof, and in step with the pictures thereof, substantially as and for the purposes set forth.

This specification signed and witnessed this 19th day of October, 1905.

FRANK L. DYER.
DELOS HOLDEN.

Witnesses:
J. F. RANDOLPH,
ANNA R. KLEHM.